3,524,728
CLOSED CYCLE SYSTEM FOR THE GENERATION OF CHLORINE DIOXIDE

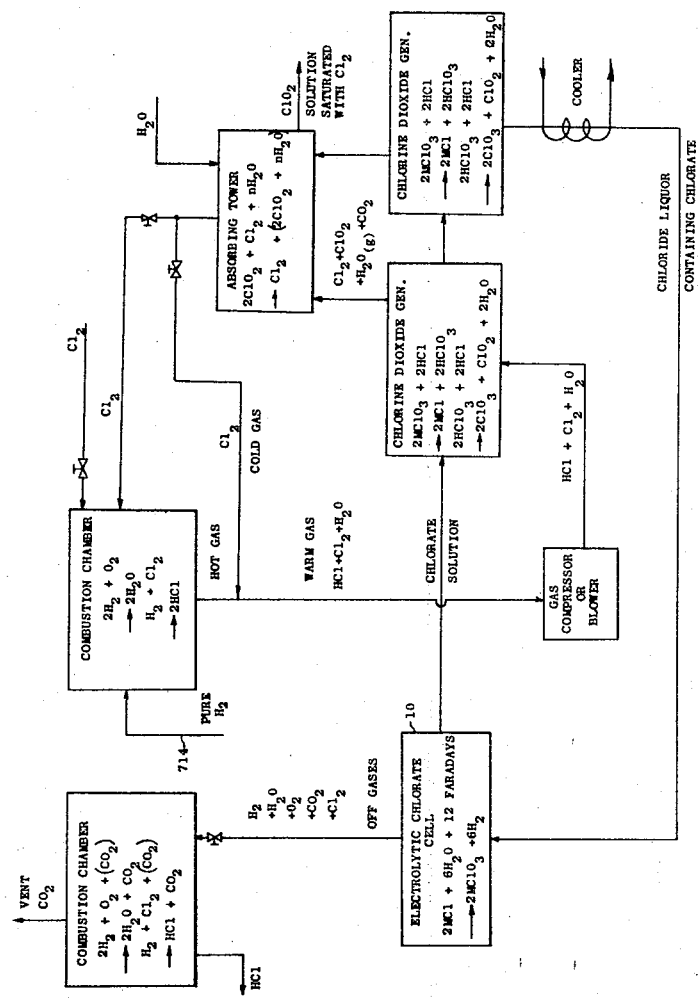

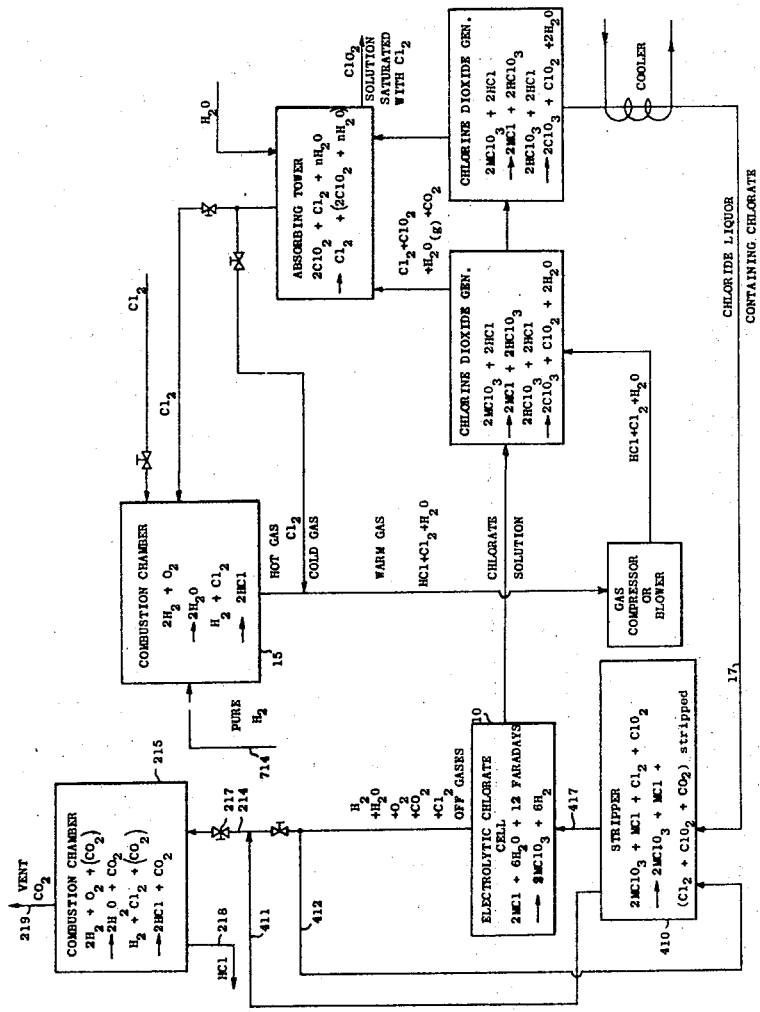

Gothe Oscar Westerlund, Vancouver, British Columbia, Canada, assignor to Chemech Engineering Ltd., Vancouver, British Columbia, Canada
Filed Oct. 2, 1967, Ser. No. 675,272
Claims priority, application Canada, Oct. 5, 1966, 972,150
Int. Cl. B01k 1/00; C01b 11/00, 11/26
U.S. Cl. 23—262  18 Claims

ABSTRACT OF THE DISCLOSURE

A continuous recyclic process and apparatus for the production of chlorine dioxide from an aqueous chloration solution of gaseous hydrochloride. The hydrogen chloride is formed in situ by combustion of hydrogen gas and chlorine gas. The chlorine dioxide is used for bleaching pulp.

---

This invention relates to the production of chlorine dioxide, and more particularly to an improved process for producing chlorine dioxide continuously and rapidly with high yields.

Chlorine dioxide has been prepared by treating chlorates with sulphuric acid with mixtures of sulphuric acid and an organic reducing agent such as oxalic acid. These processes are, in general, uneconomical, hazardous and wasteful.

For example, Harry N. Tatomer's process of producing chlorine dioxide, Canadian Pat. No. 452,351 issued Nov. 2, 1948, employs chlorate solution, sulphuric acid and chloride solution and generates at least one mole of chlorine for every two moles of chlorine dioxide. The effluent liquor is rich in chemicals which go to waste unless expensive recovery equipment such as evaporators and crystallizers are employed, or unless the chemicals in the effluent liquor are utilized by other processes.

Processes using a metallic chlorate and mixtures of a strong mineral acid and reducing agents such as sulfur dioxide, chromic acid, nitrogen peroxide, alcohols and aldehydes yield chlorine dioxide with lower chlorine concentrations. However, the efficiency or yield of chlorine dioxide is not as high and the reagents are more expensive. Canadian Pat. No. 533,803, issued Nov. 27, 1956 to Francis H. Dole uses sulphur dioxide in a mixture of a sulphuric acid and sodium chlorate solution. Another example is Henry C. Marks et al., U.S. Pat. No. 2,616,792 issued Apr. 1, 1949 which uses an excess of nitrogen peroxide on chlorate solution. Still another example is S. H. Persson's Canadian Pat. No. 438,316 issued Dec. 3, 1946, uses chromic sulphate on an acidified chlorate solution. Finally, Max L. Audonaud's Canadian Pat. No. 512,954 issued May 17, 1955 produces a chlorine dioxide by blowing air or inert gas through a porous member into an acid solution of chlorate.

It is also well known that hydrochloric acid and chloric acid may be reacted to produce gaseous mixtures of chlorine dioxide and chlorine, as in George A. Day's Canadian Pat. 461,586 issued Dec. 6, 1949 and U.S. Pat. No. 2,664,341 issued Dec. 29, 1953. In practice these reactions are carried out by treating aqueous mixtures of water-soluble chlorates and chlorides, such as may be obtained for example by chlorinating lime or by the electrolysis of salt, with an excess of a strong inorganic acid, such as hydrochloric acid or sulphuric acid. The following equations represent these reactions:

(1) $2NaClO_3 + 4HCl = 2ClO_2 + Cl_2 + 2NaCl + 2H_2O$ 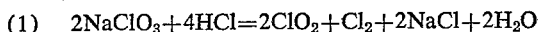
(2) $2NaClO_3 + 12HCl = 6Cl_2 + 2NaCl + 6H_2O$ 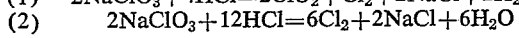

Ordinarily reaction (2) is predominant over reaction (1) and the yield in chlorine dioxide is correspondingly low.

To minimize reaction (2) it has been suggested to react properly proportioned mixtures of chlorates, chlorides and a strong inorganic acid in dilute solutions (containing at least 50% and preferably up to 75% of water) at temperatures below 60° C. Based on reaction (1), equivalent ratios of $Cl^-/ClO_3^- = 2$ and of $H^+/ClO_3^- = 2$ should give high yields of $ClO_2$ per mol of chlorate decomposed. In practice, however, it has been proposed in particular to use a ratio of $H^+/ClO_3^-$ in excess of 2 because reaction (2) uses some of the chlorate in producing chlorine instead of $ClO_2$. This proposal results in the use of excessive quantities of acid.

Furthermore, it has been recognized that a high yield of $ClO_2$ per mol of chlorate decomposed, while desirable, is not alone sufficient to make the process economical for large scale production of chlorine dioxide. As a matter of practical necessity, it has therefore been recommended that the decomposition of the chlorate initially present be carried substantially to completion to avoid any appreciable waste of this valuable raw material. However, the requirement of consuming all, or almost all, of the chlorate entails inherent difficulties which greatly decrease the efficiency, rapidity and therefore the economy of the older process. One difficulty is the fact that the average hourly output of $ClO_2$ is necessarily low because the reaction rate decreases considerably as the concentration of the reactants, particularly of chlorate, decreases. The use of solutions of low chlorate content further magnifies this effect and wastes valuable space in the reaction chamber. Finally, as the concentration of chlorate decreases, reaction (2) contributes increasingly to the decomposition of the chlorate whereby the overall yield of chlorine dioxide is lowered.

Another prior process involves reacting solutions of chlorates with hydrochloric acid, the acid being supplied in amount substantially less than the equivalent stoichiometric ratio of $H^+/ClO_3^- = 2$ of reaction (1), thereby decomposing at any one time only a fraction of the available chlorate, said decomposition thus proceeding at a particularly rapid rate, enriching the chlorate content of the partially spent solution, as for example by feeding it to an electrolytic chlorate cell, returning the fortified solution to the reaction chamber to treat it again with a stoichiometrically insufficient amount of acid; and repeating this cycle, whereby substantially all the chlorate supplied is eventually efficiently decomposed, producing mixtures of chlorine dioxide and chlorine containing high proportions of chlorine dioxide.

However, the process is generally unsatisfactory since it uses hydrochloric acid, which is considerably more expensive than chlorine and in remote areas is prohibitive because of transportation cost. Secondly, additional expensive equipment is necessary to produce the compressed air which is used as dilutent for the chlorine dioxide and chlorine generator gases to reduce the inherent explosion hazard of the process.

Again, in the aforesaid process, external heat or steam is required to vaporize hydrogen chloride and to maintain desired reaction temperature in the gas-generators.

Finally, a minimum of one mole of chlorine is produced per two moles of chlorine dioxide generated. Since the raw material is hydrochloric acid, the chlorine is produced from the purchased acid. This is a large economic penalty since the cost of the acid used as raw material normally is considerably higher than the equivalent cost of chlorine if purchased.

Copending application Canadian Ser. No. 906,199 filed June 30, 1964 provides an improved continuous recyclic process and apparatus for the production of chlorine dioxide. The present invention is an improvement over the process of that application which involves the steps of (a) effecting electrolysis of an aqueous solution of a metal chloride whereby to form (i) an aqueous solution of a metal chlorate and (ii) gaseous hydrogen; (b) reacting the gaseous hydrogen (a)(ii) with gaseous chlorine whereby to form (iii) gaseous hydrogen chloride; (c) reacting the aqueous solution of metal chlorate (a)(i) with the gaseous hydrogen chloride (b)(iii) whereby to form (iv) an aqueous solution of metal chloride, which is recycled to step (a) and (v) an aqueous solution of chloric acid, and (d) reacting the aqueous solution of chloric acid (c)(v) with the gaseous hydrogen chloride (b)(iii) whereby to form (vi) chlorine dioxide, which is recovered; (vii) water and (viii) gaseous chlorine which is recycled to step (b).

An object of one aspect of the present invention is the provision of a process for preparing chlorine dioxide from an aqueous chlorate solution and gaseous hydrogen chloride in which explosion hazards attendant with the production of such gaseous chlorine dioxide are minimized.

An object of another aspect of the present invention is the provision of a process for preparing chlorine dioxide from an aqueous chlorate solution and gaseous hydrogen chloride formed in situ by combustion of hydrogen gas and chlorine gas in which the production capacity in the combustion reaction is increased.

An object of yet another aspect of the present invention is the provision of a continuous recyclic process for the production of chlorine dioxide in which a minimum of raw materials is necessary to maintain the operation thereof.

An object of another aspect of the present invention is the provision of a continuous recyclic process for the preparation of chlorine dioxide in which no substantial gaseous by-products are produced.

An object of yet another aspect of the present invention is the provision of a continuous recyclic process for the production of chlorine dioxide in which the system is self-contained in regard to heat.

An object of still another aspect of the present invention is the provision of a continuous recyclic process for the production of chlorine dioxide which is particularly suited for pulp mills producing bleached pulp.

An object of a still further aspect of the present invention is the provision of a continuous recyclic process for the production of chlorine dioxide which is simple and safe in operation and easily controlled.

An object of a still further aspect of this invention is the provision of a continuous process for the production of chlorine dioxide involving preparation of primary reactants in electrolytic cells operating under conditions tending to minimize current efficiency losses.

An object of another aspect of the present invention is the provision of apparatus for the continuous production of chlorine dioxide.

By one broad aspect of this invention, there is provided, in a process for converting an aqueous solution of chlorate into chlorine dioxide by reaction thereof with hydrogen chloride, the improvement of diluting the hydrogen chloride with sufficient chlorine gas to provide a final gaseous reaction product comprising less than 10% chlorine dioxide diluted with 90% or more chlorine gas, or diluted with 90% or more of a mixture of chlorine, carbon dioxide and water vapor.

By another broad aspect of this invention, there is provided, in a process for converting an aqueous solution of chlorate into chlorine dioxide by reaction thereof with hydrogen chloride gas produced in situ by combustion of hydrogen gas with chlorine gas at a temperature in excess of 600° C., the improvement which comprises cooling the so-produced hydrogen chloride gas to a temperature of 150° C. or less by diluting said hydrogen chloride gas with sufficient chlorine gas or gas mixture from chlorine dioxide generator, thereby to provide a final gaseous reaction product comprising less than 10% chlorine dioxide diluted with 90% or more chlorine gas, or diluted with 90% or more of a mixture of chlorine, carbon dioxide and water vapor.

By yet another broad aspect of the present invention, a continuous process for the production of chlorine dioxide is provided, which comprises: (a) effecting electrolysis of an aqueous solution of a metal chloride whereby to form (i) an aqueous solution of a metal chlorate and (ii) gaseous hydrogen; (b) reacting gaseous hydrogen with gaseous chlorine whereby to form (iii) gaseous hydrogen chloride, (c) reacting the aqueous solution of metal chlorate (a)(i) with gaseous hydrogen chloride from step (b)(iii) whereby to form (iv) an aqueous solution of metal chloride, (v) an aqueous solution of chloric acid, (d) reacting the aqueous solution of chloric acid (c)(v) with the gaseous hydrogen chloride from step (b)(iii) whereby to form (vi) chlorine dioxide, which is recovered (vii) water and (viii) gaseous chlorine, and (e) mixing a preselected amount of gaseous chlorine with the gaseous hydrogen chloride reactant for step (d) whereby to provide a final product from step (d) consisting of up to 10% chlorine dioxide and 90% or more chlorine or a mixture of chlorine, carbon dioxide and water vapor.

By yet another aspect of this invention, a closed cycle chlorine dioxide generation system is provided, comprising (a) an electrolytic apparatus for the generation of an aqueous solution of chlorate (b) a generator for generating chlorine dioxide from said chlorate solution and hydrogen chloride (c) means connecting the liquor outlet of said electrolytic apparatus (a) with the liquor inlet of said generator (b), (d) apparatus for the conversion of cell gases for apparatus (a) to hydrogen chloride, (e) means connecting the gas outlet of apparatus (a) to the gas inlet of apparatus (d), (f) means connecting the gas outlet of apparatus (d) with the gas inlet of generator (b), (g) means for separating chlorine dioxide from gaseous chlorine, (h) means connecting the gaseous outlet of generator (b) with the inlet of separator (g), (i) means connecting the gas outlet of separator (g) to apparatus (d), and (j) means connecting the gas outlet of separator (g) to the gas inlet of generator (b).

The present invention therefore provides a process for the manufacture of chlorine dioxide which is based on following main reactions: (Mi=metal ion)

(1) $2MCl + 6H_2O + 12\text{ FARADAYS} \rightarrow 2MClO_3 + 6H_2$ (2) $2H_2 + 2Cl_2 \rightarrow 4HCl$ (3) $2MClO_3 + 2HCl \rightarrow 2MCl + 2HClO_3$ (4) $2HClO_3 + 2HCl \rightarrow 2ClO_2 + Cl_2 + 2H_2O$ The system is balanced as follows:

(5) 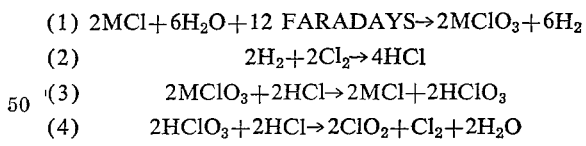

The action of hydrogen chloride on the metal chlorate solution will produce chlorine dioxide and chlorine according to reactions (3) and (4). By controlling the acidity and by utilizing an excess of the metal chlorate, reaction (3) and (4) can be caused to yield $ClO_2:Cl_2$ in ratio 2:1. Chlorine is consumed in reaction (2) for production of hydrogen chloride, thus, the system will yield chlorine dioxide only, free of chlorine to the extent of the efficiency of chlorine dioxide gas separator. Since the system is closed, after the initial charge of metallic chloride, no addition of salt is required. Furthermore, the electrolysis in reaction (1) will produce 3 times the required amount of hydrogen. The process of the present invention is thus based on a system which requires water, chlorine and electric current for the production of chlorine dioxide.

The present invention is basically a closed system with essentially no major effluent liquor other than the output of chlorine dioxide solution. Therefore, losses of reagents are minimized and the manufacturing cost of chlorine dioxide will be determined by cost of power and chlorine. Thus, the system in the present invention is self-regenerating in regard to chemicals except for chlorine and water. At 100% yield, one mole of chlorine is required for production of two moles of chlorine dioxide. The only other raw material is electrical energy, the two moles of water per mole ClO₂ being insignificant.

Another important aspect of the present invention is that the process yields chlorine dioxide in a safe and efficient manner. Any hydrogen gas tending to remain in the chlorine dioxide generator reacts in situ with the excess chlorine gas diluent in the chlorine dioxide generator to provide gaseous hydrogen chloride. This gas is one of the reactants to produce chlorine dioxide.

In addition, the chlorine dioxide gas produced in the chlorine dioxide generator is diluted, preferably to less than 10%. This dilution is advisable in order to minimize the risk of explosion of chlorine dioxide gas.

Another aspect of the present invention is that the process is self-contained in regard to heat insofar as it generates an excess of heat for the process in the combustion chamber:

$$\tfrac{1}{2}H_2 + \tfrac{1}{2}Cl_2 \rightarrow HCl + 1000 \text{ kcal./m.}^3 \text{ STP-gas}$$

The temperature in the ClO₂ generator is controlled by the heat content of gases from the combustion chamber.

The reactant gases fed to such combustion chamber will also contain excess chlorine. Consequently the effluent gas from the combustion chamber will not contain any excess hydrogen. This tends to make the operating very safe and easy.

In addition, the system of this aspect of the present invention has the advantage that the gas flow through the combustion chamber will be determined by the production requirements of hydrogen chloride. Thus, the temperature in the combustion chamber could be maintained high. The temperature in the combustion chamber will be in excess of 600° C., usually of the order of 1000° C. This high temperature of combustion in the combustion chamber tends to insure substantially complete utilization of the oxygen in the cell gases without employing catalyzers. It also permits a high production capacity for any one combustion chamber. The hot gases, namely hydrogen chloride and water vapour, leaving the combustion chamber are cooled down by the chlorine gas which is, as hereinbefore stated, recirculated for the purpose of diluting the product chlorine dioxide gas. Thus, the total heat value is recovered, since there is no heat transfer. Simultaneously, the gas temperature is lowered to about 150° C. or less by such utilization of the cool chlorine recirculation stream as the direct contact cooling medium by the gas recirculation to facilitate utilizing conventional types of gas compressors, piping and makes the effect of gas entrance to the generator less violent. If it is desired to lower the temperature further than achieved by the optimum recirculation rate of chlorine (and carbon dioxide) then a heat exchanger or suitable cooling coils could be employed in the combustion chamber or external thereto as may be the case. The cooling may be done using the chlorate feed solution from the chlorate process or from other media.

Operating at high temperatures in the chlorine dioxide generator results in a substantial water evaporation and heat loss. Thus, the process of this aspect of the present invention, by reducing the temperature of the input gaseous reactants, tends to minimize the water evaporation and heat losses. If the heat evolved from above combustion reaction and from gas compressor or blower is insufficient to maintain a desirable temperature in generator, part of the excess hydrogen can be combusted with air in the combustion chamber according to following combustion reaction:

$$H_2 + \tfrac{1}{2}O_2 \rightarrow H_2O + 2600 \text{ kcal./m.}^3 \text{ STP-gas}$$

Another aspect of the present invention is that the process favors operating the electrolytic cells at a low pH. Thus, current efficiency losses by the decomposition of hypochlorite will be minimized and the chemical attack on graphite electrodes will be less severe. The chlorine losses to cell gases may be higher but the chlorine is subsequently combusted with hydrogen to form hydrogen chloride and thus benefits the production of chlorine dioxide.

Another aspect of the present invention is that the process minimizes the dangers of explosion from chlorine dioxide by recirculating excess chlorine in order to dilute the generated gases. Designing the system for short gas retention time and a large surface contact area, controlling temperature of gas mixture after generator and avoiding ultraviolet light will eliminate hazards of explosions.

If, as in one aspect of the present invention, the hydrogen for the process is derived from the off-gases of the electrolytic chloride cell, then provision must be made to control the carbon dioxide in the recirculating stream. Carbon dioxide will otherwise accumulate, requiring increased flow rate through the combustion chamber thus resulting in a lower combustion temperature and in incomplete combustion.

The recirculation may be utilized to control the temperature in the combustion chamber. However, eventually some of the gas must be released from the system. Alternatively a conventional type of carbon dioxide scrubbing system is employed.

In another embodiment a second combustion chamber could be employed for recovering the chlorine from the "bleed" gas and simultaneously also venting the excess carbon dioxide by burning the chlorine gas with excess hydrogen from the electrolyte chlorate cell. The so-formed hydrogen chloride may be recovered per se, may be dissolved in water to form hydrochloric acid or may be recycled to the chlorine dioxide generator. Alternatively, hydrogen from other sources, e.g., chlorine-alkali plants, which would be almost pure could be employed and thus any means, such as the second combustion chamber or the CO₂ scrubber, would not be required. A "stripper" may also be provided in the system. This is to remove entrained chlorine and chlorine dioxide gas from the chlorine dioxide generator effluent liquor. Alternatively, the stripper could be employed at the generator before cooling the liquor.

In the accompanying drawings:

FIG. 7 is an idealized, schematic, diagrammatic representation of a process, including the chemical equations, of a seventh aspect of the present invention; and FIG. 8 is an idealized, schematic, diagrammatic representation of a process, including the chemical equations, of an eighth aspect of the present invention.

Figure 1:
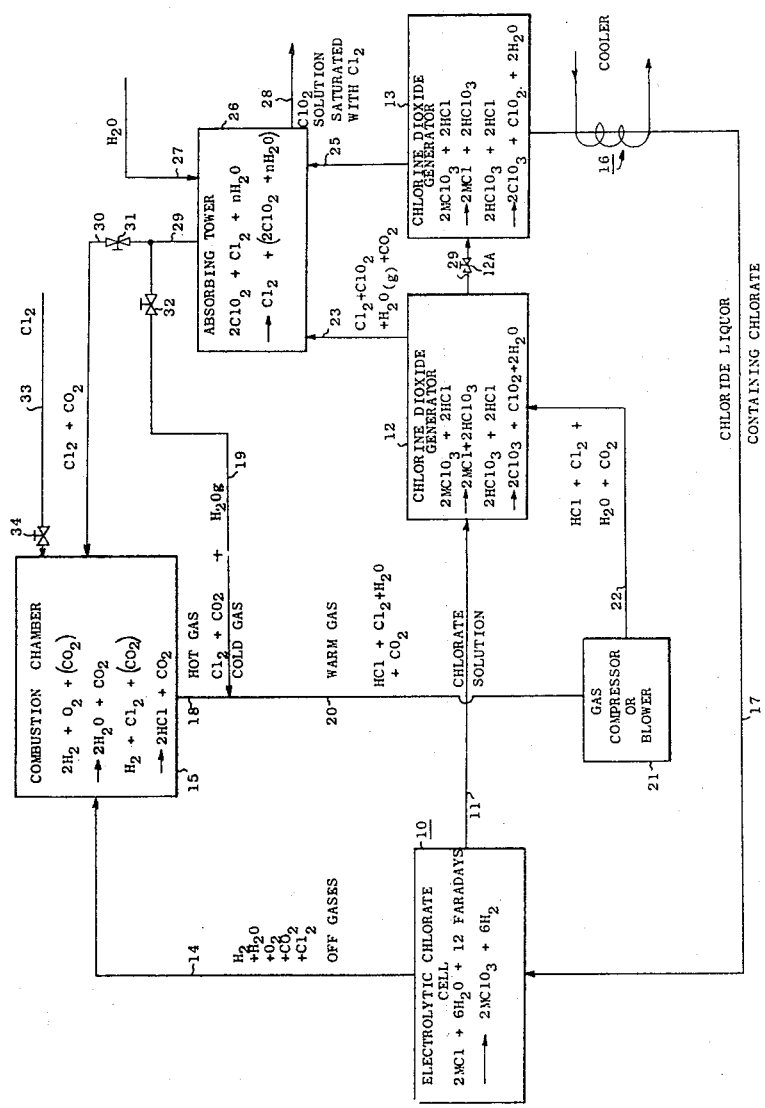
FIG. 1 is an idealized, schematic, diagrammatic representation of a process, including the chemical equations, of a first aspect of the present invention.

Turning first to FIG. 1, an electrolytic cell 10, which may be that disclosed and claimed in pending Canadian application Ser. No. 901,153 filed Apr. 24, 1964, operates to electrolize an aqueous solution of a metal chloride, for example sodium chloride. The liquid products proceeds via line 11 to chlorine dioxide generator 12 and 13, arranged in series to one another or combined as one unit and the gaseous products proceed via line 14 to a combustion chamber 15, whose purpose and function will be described hereinafter. The liquor is induced to react in manner to be described in detail hereinafter in the chlorate generators 12 and 13 and is recycled, after being cooled in cooler 16 and line 17 to electrolytic cell 10. The effluent liquor from chlorine dioxide generator 12 and 13, in line 17, is normally high in chlorate concentration as well as chloride.

The off-gases consisting mainly of hydrogen but including smaller amounts of other gases such as water vapour, oxygen, carbon dioxide and chlorine are burned in combustion chamber 15 to provide hydrogen chloride gas and additional water vapour. The hot gases, usually at a temperature in excess of 900° C. emerge from combustion chamber 15 via line 18 and are mixed and diluted with a cold, gaseous mixture of chlorine and carbon dioxide from branch line 19 or in the combustion chamber 15 to provide, in line 20, a warm gas at a temperature of approximately 100° C. consisting of hydrogen chloride, chlorine, water vapour and carbon dioxide. The warm gas in line 20 is admitted to a gas compressor or blower 21 by means of which it is fed via line 22 to chlorine dioxide generator 12. The gaseous effluent, namely chlorine dioxide, water vapour, carbon dioxide and chlorine diluent gas, is fed via line 23 to an absorbing tower 26. The gas leaving generator 12 in line 23 is $Cl_2(g) + ClO_2(g) + H_2O(g) + CO_2^*(g)$ (assuming the electrolytic cell employs carbon electrodes and the cell off-gas is being used for HCl-combination). The liquid effluent from chlorate generator 12 is fed via line 24 to a second chlorine dioxide generator 13 or a chamber within the same generator, where additional chlorine dioxide gas is formed. The gaseous effluent consisting of chlorine dioxide gas, chlorine gas diluent and water vapour is fed via line 25 to absorbing tower 26. The liquid effluent consisting of chloride liquor together with unreacted chlorate is first cooled by cooler 16 and is fed, as previously indicated, via line 17 back to electrolytic chlorate cell 10.

In absorbing tower 16 the gaseous effluent from chlorine dioxide generators 12 and 13 is contacted with cold water entering absorbing tower via line 27. Chlorine dioxide solution is withdrawn via line 28, and the less water-soluble gases are vented from absorbing tower 26 through line 29. The chlorine dioxide solution in line 28 is also saturated with gaseous chlorine.

Line 29 branches into line 30 which feeds a portion of the non-absorbed gases, consisting mainly of chlorine, carbon dioxide, water vapour and carbon dioxide to the combustion chamber 15, the amount of such gases being controlled by valve 31. Line 29 also branches to line 19 where, as previously indicated, a cold, gaseous mixture of chlorine, carbon dioxide, water vapour and carbon dioxide is added, as a diluent gas, to the hot combustion products of combustion chamber 15. The amount of such cold gas used as a diluent is controlled by valve 32.

Additional chlorine gas to react with the excess hydrogen in combustion chamber 15 is fed to combustion chamber 15 via line 33 controlled by valve 34, and/or is added to the generator 12 as diluant gas. Chlorine gas admitted via line 33, may also be used to dilute gas from generator 13. The gas leaving generator 13 in line 25 is otherwise high in $ClO_2(g)$ concentration.

While the process previously described is useful and efficient, carbon dioxide, which is present in small amounts in the off-gases from electrolytic chlorate cell 10, tends to accumulate, requiring increased flow rates through the combustion chamber which also results in a lower degree of combustion. Accordingly, it is preferred that excess carbon dioxide be removed from the closed cycle system. The embodiments shown in FIGS. 2 and 3 are two different alternative procedures for the removal of such excess carbon dioxide.

In the description of FIGS. 2–8, which follows, only the parts of the drawings which are different from the part previously described in FIG. 1 will be explicitly described, in the interest of conciseness and in order to avoid redundancy.

Figure 2:
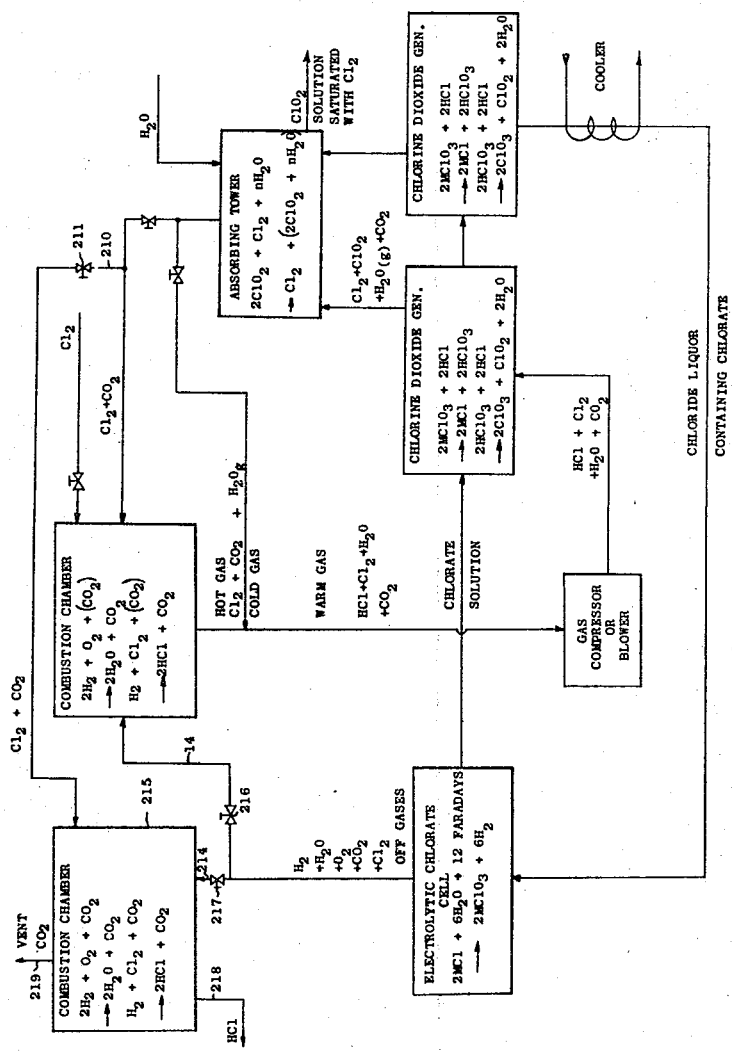
FIG. 2 is an idealized, schematic, diagrammatic representation of a process, including the chemical equations, of a second aspect of the present invention.

In FIG. 2, the excess carbon dioxide is removed by means of a second combustion chamber 215. A predetermined, controlled amount of off-gases from electrolytic chlorate cell 10 is fed via branch line 214 controlled by valve 217, to the second combustion chamber 215. In addition and periodically, a bleed of the non-absorbed gases from absorbing tower 26 is conducted via line 210, controlled by valve 211, to the second combustion chamber 215. Carbon dioxide is vented to atmosphere via stack 219 and the hydrogen chloride combustion product is removed via outlet line 218. The hydrogen chloride may either be recycled to outlet 18 of combustion chamber 15 to be used in the cyclic chlorine dioxide generation system or, it may be dissolved in water to form commercially useful hydrochloric acid.

Figure 3:
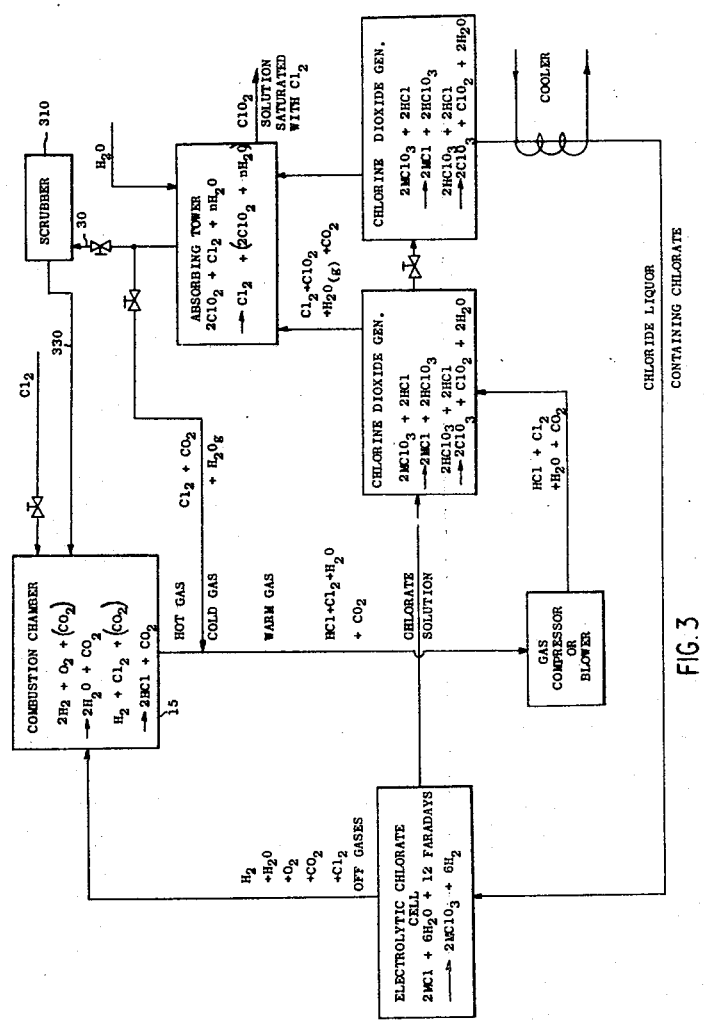
FIG. 3 is an idealized, schematic, diagrammatic representation of a process, including the chemical equations, of a third aspect of the present invention.

In the embodiment shown in FIG. 3 on the other hand, the carbon dioxide is removed by means of a conventional carbon dioxide scrubber. Thus, line 31 has disposed therein in series with its line of flow, a conventional scrubber 310 which removes the carbon dioxide from line 330 which is used to feed chlorine gas diluent to the combustion chamber 15.

Figure 4:
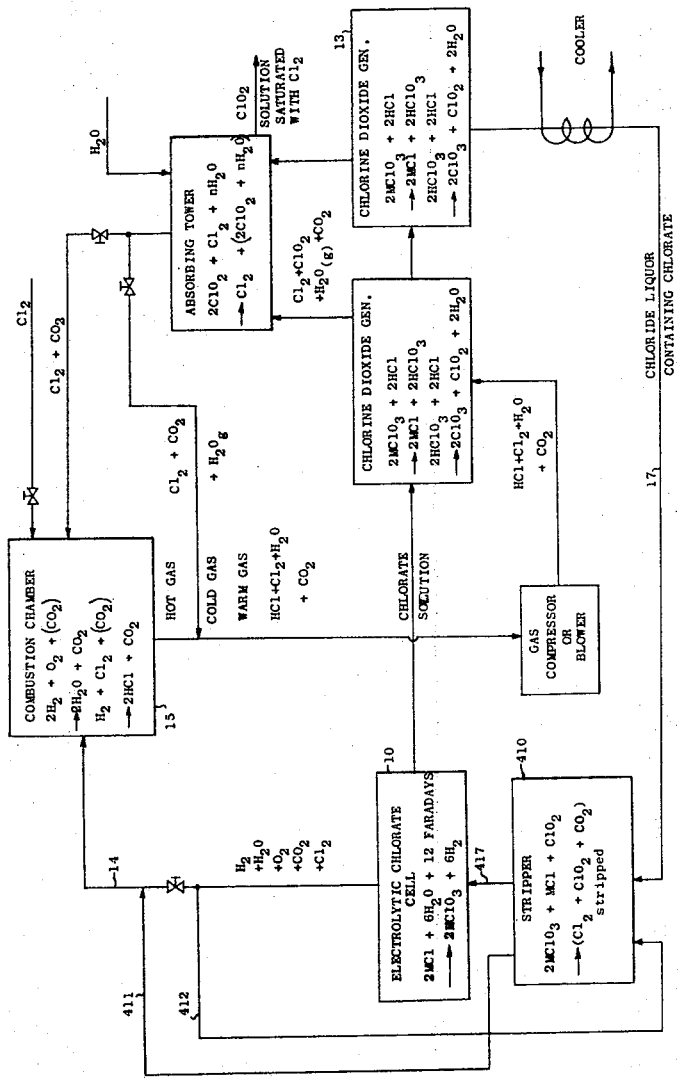
FIG. 4 is an idealized, schematic, diagrammatic representation of a process, including the chemical equations, of a fourth aspect of the present invention.

It is also advisable to remove entrained chlorine gas, carbon dioxide gas and chlorine dioxide gas from the chloride and chlorate liquor feed which is recycled from the chlorine dioxide generator 13 to the electrolytic chlorate cell 10. This is shown in FIG. 4 as the stripper 410. This stripper is a conventional one to separate the gaseous products which are entrained or entrapped in a liquid from the liquid. The chloride and chlorate liquor effluent is fed from stripper 410 to electrolytic chlorate cell 10 by means of line 417. The gaseous effluent from the stripper 410 is fed via line 411 to off-gas line 14. A portion of the gas is then conveyed through combustion chamber 15 and the remaining portion is recycled via line 412 to stripper 410.

Figure 5:
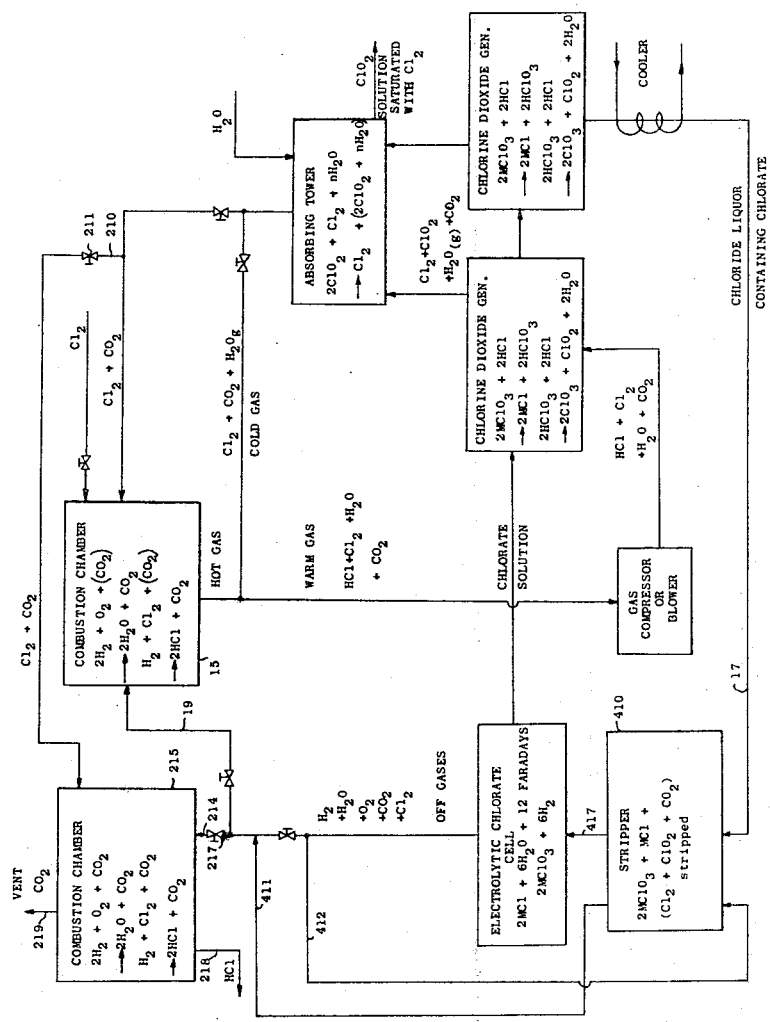
FIG. 5 is an idealized, schematic, diagrammatic representation of a process, including the chemical equations, of a fifth aspect of the present invention.

The embodiments shown in FIG. 5 incorporate the second combustion chamber 215 to remove excess carbon dioxide from the system (as fully described hereinbefore with reference to FIG. 2), as well as the stripper to remove entrained and occluded gaseous chlorine, chlorine dioxide, and carbon dioxide (as described in greater detail hereinbefore with reference to FIG. 4).

Figure 6:
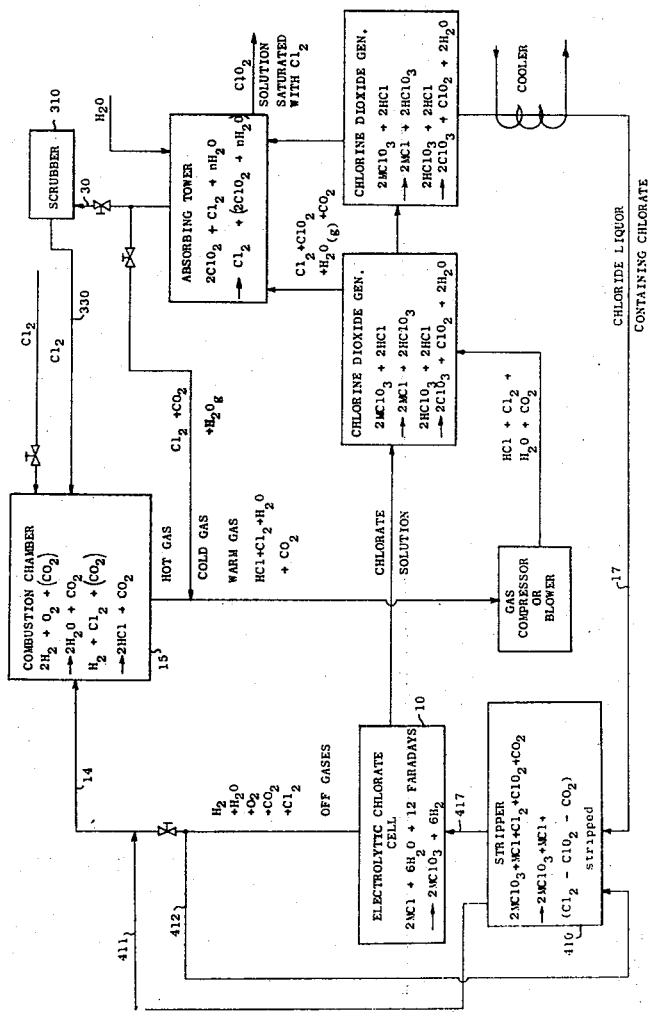
FIG. 6 is an idealized, schematic representation of a process, including the chemical equations, of a sixth aspect of the present invention.

The embodiment in FIG. 6 shows the removal of the excess carbon dioxide by means of the scrubber 310 (previously described in greater detail with reference to FIG. 3) and the stripper 410 to remove the entrained and occluded gaseous chlorine, chlorine dioxide and carbon dioxide (previously described in greater detail with reference to FIG. 4).

It is also possible to avoid the build-up of carbon dioxide in the system by using pure hydrogen from other sources, such as that derived from chlorine alkali plants. In such instance, it would not be necesary to provide any means for the removal of carbon dioxide. However, it is advisable to provide for the burning off of the off-gases produced in the electrolytic chlorate cell. Two such embodiments are shown in FIGS. 7 and 8. The embodiment in FIG. 8 differs from the embodiment in FIG. 7 only in the provision of the stripper 410 to remove entrained and occluded gaseous chlorine and chlorine dioxide from the chloride liquor in line 17 (as previously fully described with reference to FIG. 4).

In each of FIGS. 7 and 8 the second combustion chamber 215 (previously fully described with reference to FIG. 2) is provided in order to combust the off-gases from the electrolytic chlorate cell 10. As described with reference to FIG. 2 the carbon dioxide is vented via stack 219 and the hydrogen chloride gas 218 may be recycled to the system via line 18 or may be dissolved in water to provide commercially useful hydrochloric acid.

In each of FIGS. 7 and 8 the combustion chamber 15 is fed with pure hydrogen through line 714.

It is noted, therefore, that the present invention provides, in all of its embodiments a safe, easily operated, process for the continuous preparation of chlorine dioxide in a most efficient manner.

Still another possibility is employing non-carbonaceous electrodes in the electrolytic cell and thus eliminate carbon dioxide formation.

I claim:

1. A closed cycle system for the generation of chlorine dioxide, said systems comprising:
    (a) an electrolytic apparatus for the generation of an aqueous solution of chlorate, said apparatus including a liquor inlet, a liquor outlet and a gas outlet;
    (b) apparatus for generating chlorine dioxide from said chlorate solution and hydrogen chloride, said apparatus including a liquor inlet, a liquor outlet, a gas inlet and a gas outlet;
    (c) means connecting the liquor outlet of said electrolytic apparatus (a) with the liquor inlet of said generator (b);
    (d) apparatus for the conversion of cell gases for apparatus (a) to hydrogen chloride, said apparatus including gas inlet means and a gas outlet;
    (e) means connecting the gas outlet of apparatus (a) to a gas inlet means of apparatus (d);
    (f) means connecting the gas outlet of apparatus (d) with the gas inlet of apparatus (b);
    (g) separator means for separating chlorine dioxide from gaseous chlorine, said means including gas inlet means, gas outlet means, liquid inlet means and product outlet means;
    (h) means connecting the gas outlet of generator (b) with a gas inlet means of separator (g);
    (i) means connecting the gas outlet means of separator (g) to a gas inlet means of apparatus (d); and
    (j) means connecting a gas outlet means of separator (g) to a gas inlet means of generator (b).

2. The system of claim 1 including a pair of said apparatus (b) for generating chlorine dioxide connected together in series.

3. The system of claim 1 including (k) gas compressor or blower means for feeding said chlorine-diluted hydrogen chloride gas from said gas outlet of said apparatus (d) to said gas inlet of said apparatus (b) for generating chlorine dioxide.

4. The system of claim 1 wherein said separator means (g) comprises an absorbing tower for separating chlorine dioxide from the other gaseous effluent products from said apparatus (b) for generating chlorine dioxide.

5. The system of claim 4 including (l) a scrubber including gas inlet means connected to gas outlet means from absorbing tower (g) for removing carbon dioxide from the gaseous effluent from said absorbing tower.

6. The system of claim 4 wherein said apparatus (d) comprises a first combustion chamber and includes (m) a second combustion chamber including gas inlet means connected to gas outlet from said apparatus (a) and in parallel to said first combustion chamber for burning a portion of gaseous effluent from said apparatus (a), whereby to remove carbon dioxide from the system.

7. The system of claim 6 including a line connected between gas outlet means of absorbing tower (g) and gas inlet means of said second combustion chamber (m) for conducting a portion of the gases from said absorbing tower (g) to said second combustion chamber (m).

8. The system of claim 1 including (n) means connecting the liquid outlet of apparatus (b) with the liquor inlet of apparatus (a).

9. The system of claim 8 including (o) cooling means operatively associated with said connecting means (n).

10. The system of claim 8 including (p) means including liquor inlet means, liquor outlet means, gas inlet means and gas outlet means operatively associated with said connecting means (n) and connected to liquor outlet means from apparatus (b) for removing occluded and entrained gases from the liquor.

11. The system of claim 10 including (q) means connecting the gaseous outlet of said means (f) to the gas connecting means (e), and (r) second means connecting said gas connecting means (e) to the gas inlet means of said means (p).

12. The system of claim 9 including a pair of said apparatus (b) for generating chlorine dioxide connected together in series.

13. The system of claim 9 including (k) gas compressor or blower means for feeding chlorine-diluted hydrogen chloride gas from said gas outlet of said apparatus (d) to said gas inlet of said apparatus (b) for generating chlorine dioxide.

14. The system of claim 9 wherein said separator means (g) comprises an absorbing tower for separating chlorine dioxide from the other gaseous effluent products from said apparatus (b) for generating chlorine dioxide.

15. The system of claim 12 including (k) gas compressor or blower means for feeding chlorine-diluted hydrogen chloride gas from said gas outlet of said apparatus (d) to said gas inlet of said apparatus (b) for generating chlorine dioxide, and further wherein said separator means (g) comprises an absorbing tower for separating chlorine dioxide from the other gaseous effluent products from said apparatus (b) for generating chlorine dioxide.

16. The system of claim 14 including (l) a scrubber including gas inlet means connected to gas outlet means from absorbing tower (g) for removing carbon dioxide from the gaseous effluent from said absorbing tower.

17. The system of claim 16 wherein said apparatus (d) comprises a first combustion chamber and includes (m) a second combustion chamber including gas inlet means connected to gas outlet from said apparatus (a) and in parallel to said first combustion chamber for burning a portion of gaseous effluent from said apparatus (a), whereby to remove carbon dioxide from the system.

18. The system of claim 17 including a line connected between gas outlet means of absorbing tower (g) and gas inlet means of said second combustion chamber (m) for conducting a portion of the gases from said absorbing tower (g) to said second combustion chamber (m).

References Cited

UNITED STATES PATENTS 3,404,952   10/1968   Westerlund _____ 23—152

JOSEPH SCOVRONEK, Primary Examiner

U.S. Cl. X.R.

23—152, 154, 156; 204—95, 258